# United States Patent [19]

Shiki et al.

[11] 3,904,221
[45] Sept. 9, 1975

[54] **GAS GENERATING SYSTEM FOR THE INFLATION OF A PROTECTIVE BAG**

[75] Inventors: **Takehiko Shiki; Tadamasa Harada,** both of Nobeoka; **Ikuo Harada,** Tokyo; **Masaaki Shiga,** Kami-Fukuoka, all of Japan

[73] Assignee: **Asahi Kasei Kogyo Kabushiki Kaisha,** Japan

[22] Filed: **May 10, 1973**

[21] Appl. No.: **358,931**

[30] **Foreign Application Priority Data**

| May 19, 1972 | Japan | 47-49743 |
| Mar. 3, 1973 | Japan | 48-25527 |
| May 23, 1972 | Japan | 47-60085[U] |
| May 23, 1972 | Japan | 47-60086[U] |
| May 29, 1972 | Japan | 47-63103[U] |

[52] **U.S. Cl.** ............ 280/150 AB; 23/281; 102/39 R
[51] **Int. Cl.²** ........................................ B60R 21/08
[58] **Field of Search** ............ 280/150 AB; 102/39 R; 23/281

[56] **References Cited**
UNITED STATES PATENTS

| 3,066,014 | 11/1962 | White | 23/281 |
| 3,527,472 | 9/1970 | Chute | 280/150 AB |
| 3,618,976 | 11/1971 | Leising | 280/150 AB |
| 3,663,035 | 5/1972 | Norton | 280/150 AB |
| 3,666,289 | 5/1972 | Magyar | 280/150 AB |
| 3,690,695 | 9/1972 | Jones | 280/150 AB |
| 3,724,870 | 4/1973 | Kurokawa | 280/150 AB |
| 3,733,180 | 5/1973 | Heineck | 280/150 AB |
| 3,741,585 | 6/1973 | Hendrickson | 280/150 AB |
| 3,773,351 | 11/1973 | Catanzarite | 23/281 |
| 3,785,674 | 1/1974 | Poole | 280/150 AB |

*Primary Examiner*—David Schonberg
*Assistant Examiner*—John P. Silverstrim
*Attorney, Agent, or Firm*—Armstrong, Nikaido & Wegner

[57] **ABSTRACT**

A light compact gas generating system is provided for the inflation of a protective bag to cushion a passenger (including a driver) from impact within a high speed vehicle such as an automobile the system can generate a low temperature, non-toxic and dustless gas with such a velocity as to inflate the bag in an extremely short time (in the order of 20–60 milliseconds).

The system comprises a chamber surrounded by a wall composed at least in part of a layer comprising a plurality of metal wire gauzes which provide the passageway of the generated gas, a gas generating chemical composition enclosed in the chamber and at least one ignition tube enclosed in the chamber.

The gas generating chemical composition consists essentially of at least one member selected from the group consisting of alkali metal azides, alkaline earth metal azides and hydroxy metal azides having the general formula $M(OH)_m(N_3)_n$, wherein M represents a metal, said member being preferably strontium azide or barium azide. The composition generates non-toxic molecular nitrogen gas, which can be breathed by the passenger without ill effect.

**3 Claims, 12 Drawing Figures**

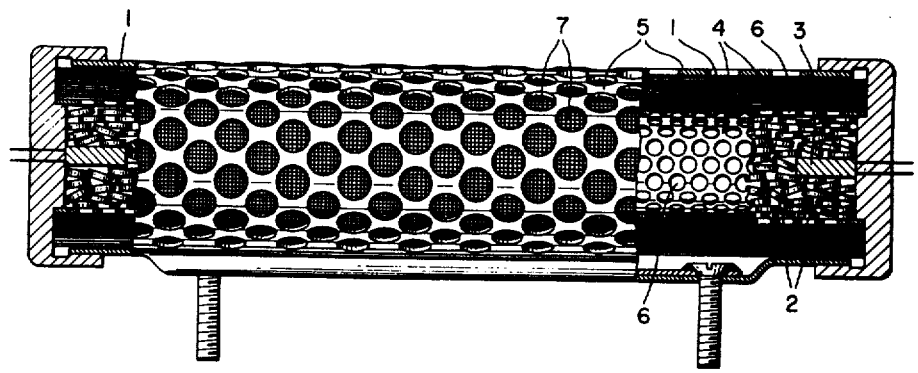

### Fig.1a

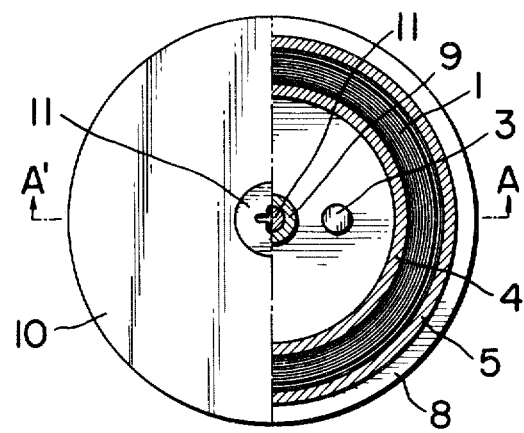

### Fig.1b

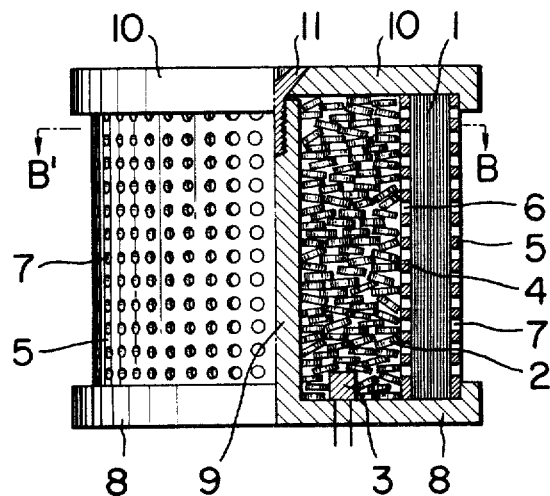

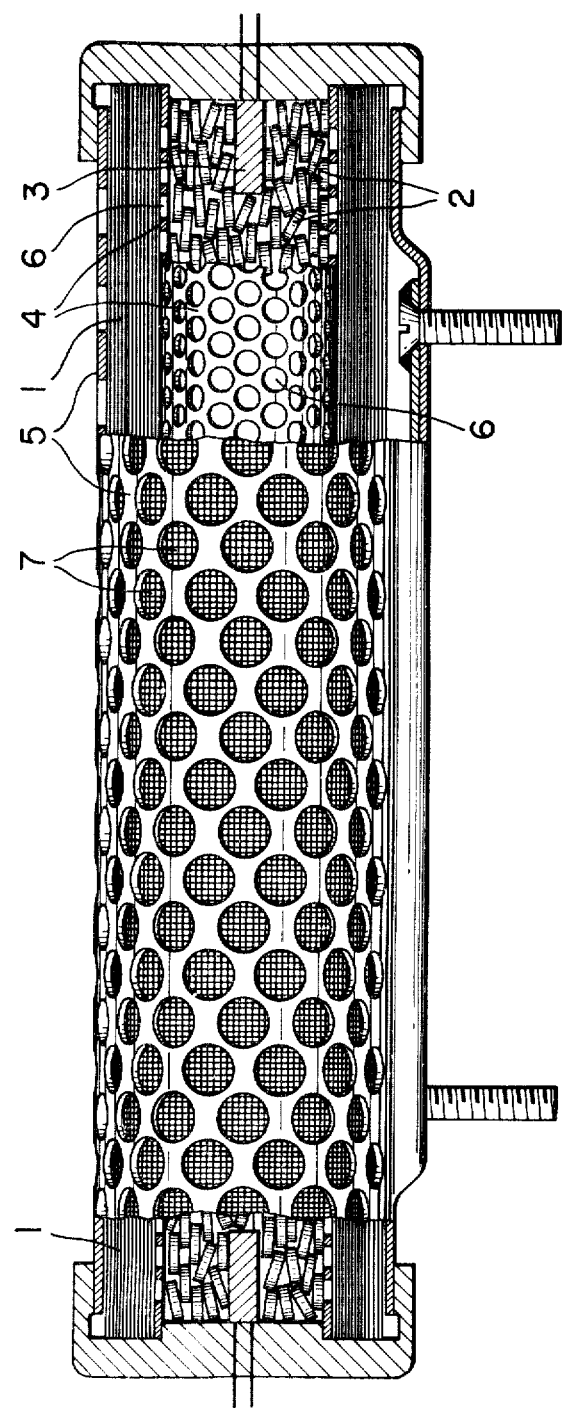

Fig. 2

Fig.3

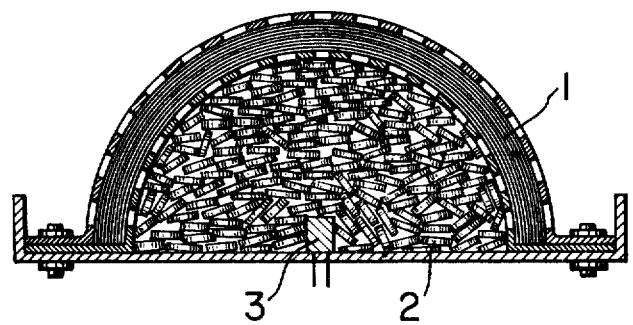

Fig.4

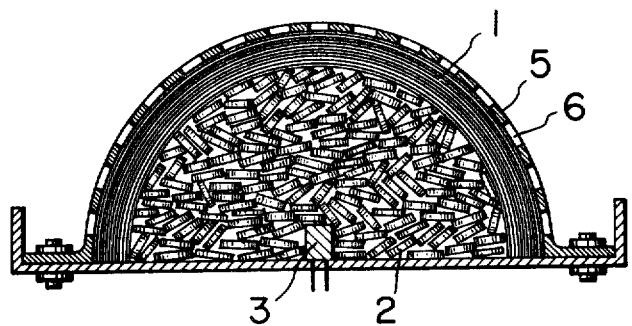

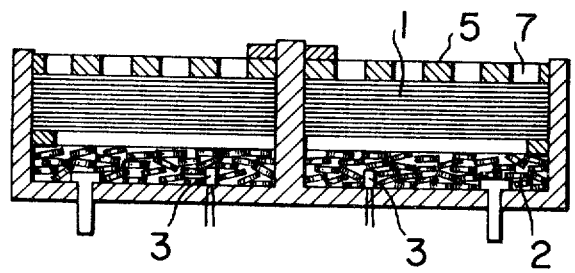

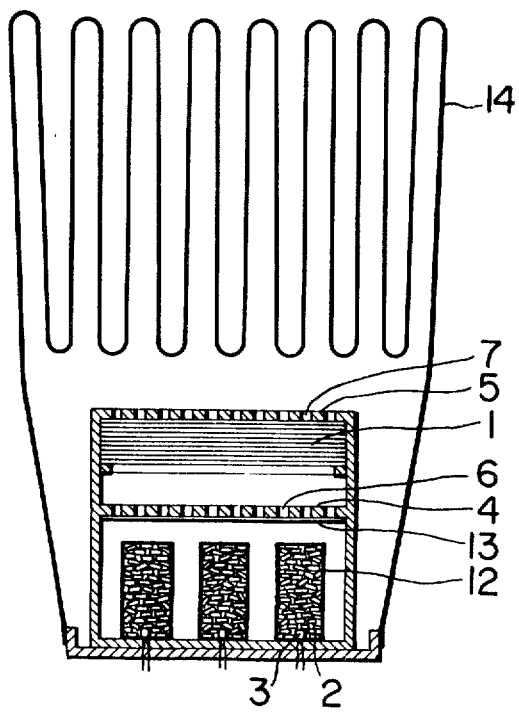

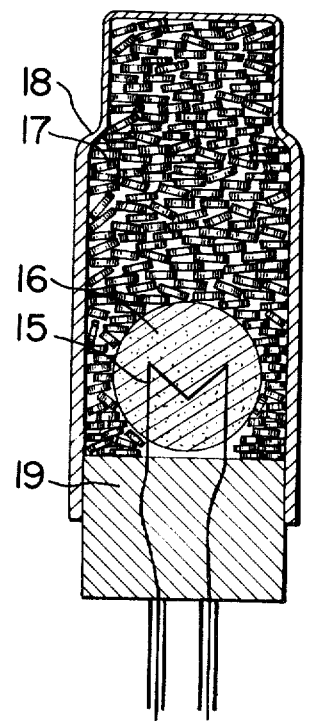

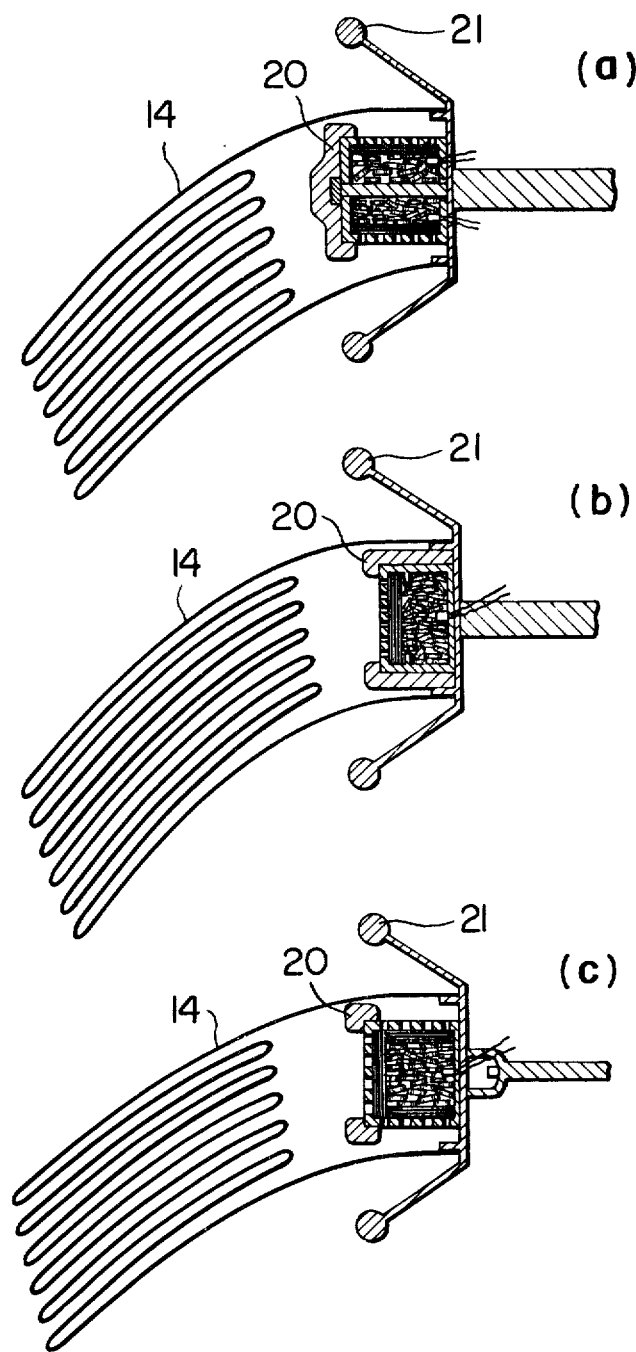

Fig. 8

## Fig. 9

(a)

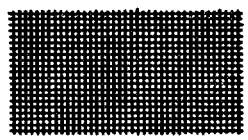

(b)

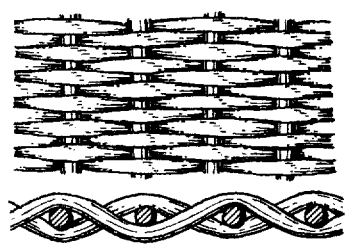

(c)

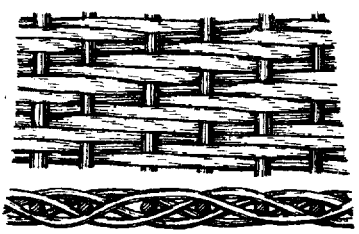

(d)

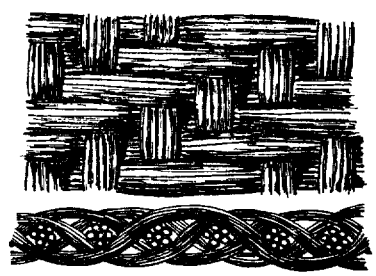

(e)

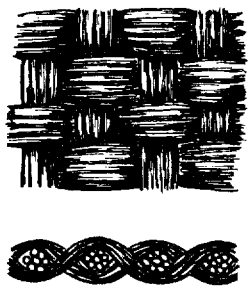

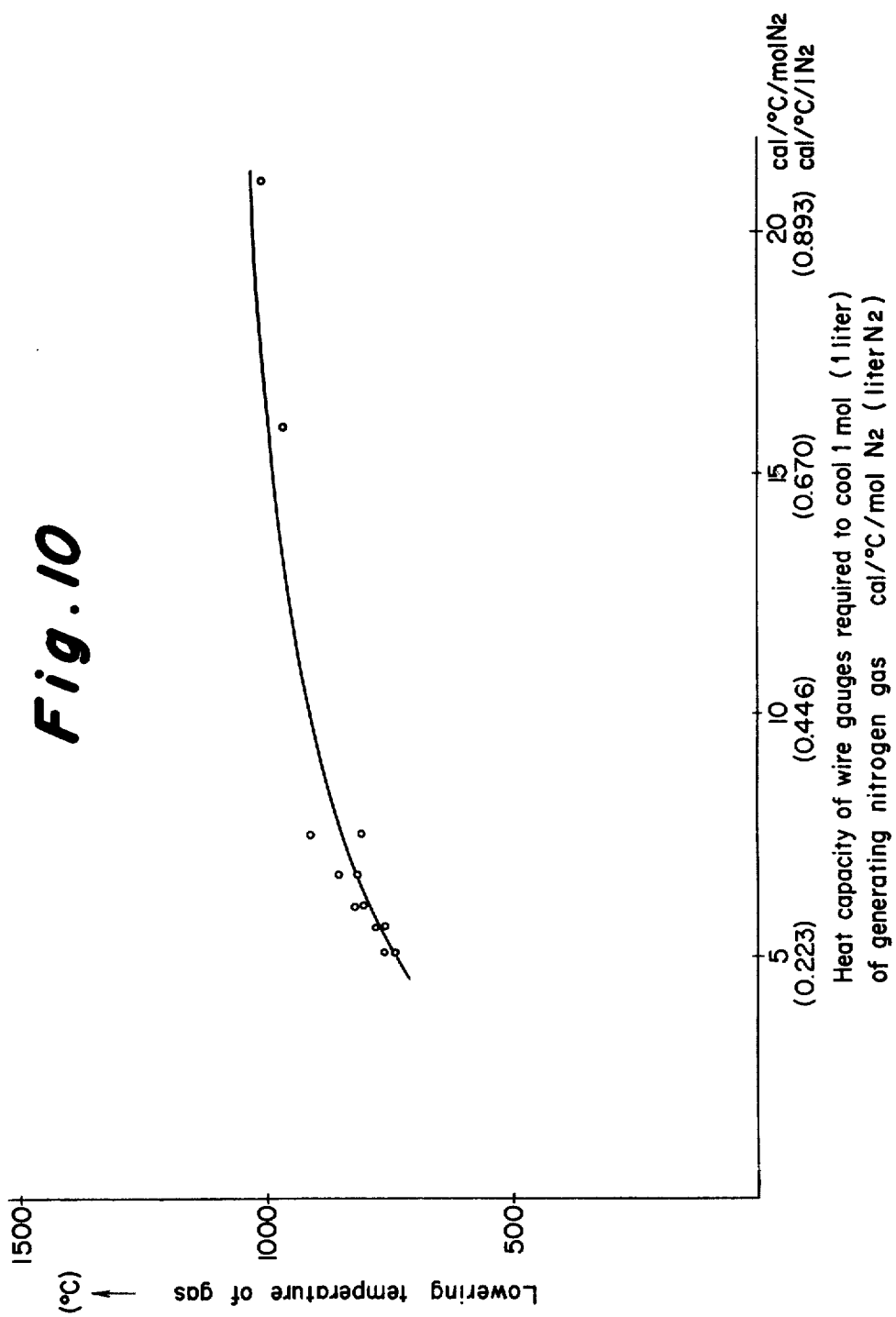

Fig. 10

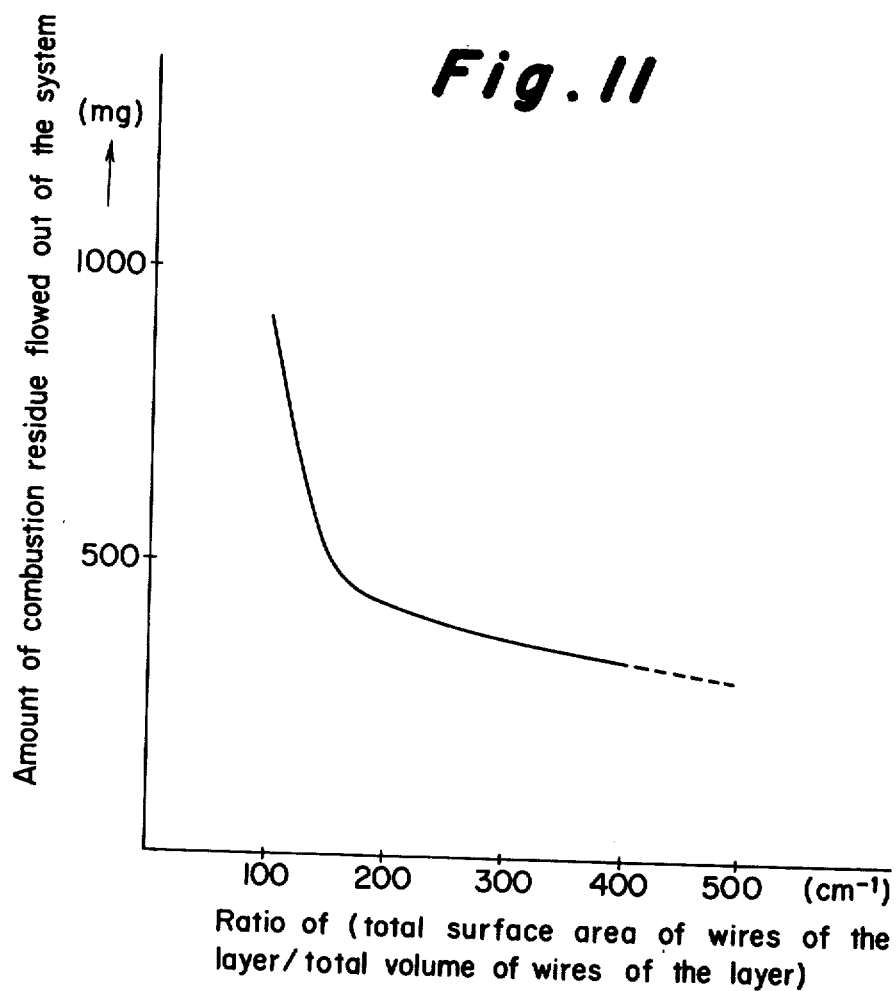

Fig. 11

# GAS GENERATING SYSTEM FOR THE INFLATION OF A PROTECTIVE BAG

## BACKGROUND OF THE INVENTION

Recently, there has been considerable interest in developing a safety means to protect a passenger from impact of a high speed vehicle, such as an automobile. Other than a safety belt, there has been developed a protective bag system, in which a folded bag is quickly inflated and deployed, at the time of a crash impact of an automobile, to prevent a passenger in the automobile from being thrown violently against the steering wheel, dashboard or other automobile structure.

A gas generating chemical composition in a solid state is preferably used as one of the gas sources for inflation of the bag, because the volume required for containing the solid composition is smaller than that of a liquid or compressed gas, a pressure resisting vessel is not necessary, and the gas generating velocity can be easily controlled.

However, the gas generating system using a solid chemical composition for the inflation of a protective bag must meet the requirements of several severe standards. First the system must generate a gas with such velocity as to inflate the bag sufficiently in an extremely short period of time. (in the order of 20–60 milliseconds), but without an explosive velocity so violent as to destroy the system and the bag. Moreover, the gas generating velocity of the system must not be changed during storage in an automobile for a long time. Second, the system must generate a non-toxic, low temperature and dustless gas within the bag space, because it is possible that the gas will be breathed by passengers, during inflation of the bag, or during discharge of the gas from the bag to alleviate the effect of rebound of the passenger from the inflating bag. As to the temperature of the generating gas, if the temperature is too high, a means for lowering the temperature of the gas sharply will be required. As to the dust, the solid chemical composition produces to some extent a combustion residue during combustion. The combustion residue must be collected substantially completely within the system, not escape into the bag space, because the temperature of the combustion residue is so high that it will possibly cause the bag to blow up and the activity thereof is so high that it will possibly injure passenger's eyes, throat, trachea, lungs, etc. Third, the system must be very compact and light, because for the driver it must be adapted to a sterring wheel, the moment of inertia of which is required to be small for a good driving operation.

A gas generating system which meets such severe standards has not been heretofore found.

Selection of a solid chemical composition for generating the gas is a first starting point for providing a gas generating system. To provide for the quick generation of gas, explosives such as black powder, smokeless powder, etc., have been tested, but they were found to be inadequate, because they produce a high temperature and toxic gas containing toxic components such as carbon monoxide, nitrogen monoxide, nitrogen dioxide, etc. It is known from U.S. Pat. No. 2,981,616 that the composition consisting of sodium azide or potassium azide, and potassium perchlorate or potassium peroxide can be used as a gas generating composition of a rocket. These composition generate mainly non-toxic molecular nitrogen gas, so that they can be naturally considered for use as a composition of the gas generating system of the bag.

As mentioned above, the protective bag must be inflated, from the moment of a crash impact of an automobile, in a very short time of the order of 20–60 milliseconds, so that the gas generating velocity based on the combustive decomposition of a chemical composition must be considerable. However, the gas generating velocity of a composition containing only a metal azide having the required sensitivity to heat and shock is insufficient to cause the bag to inflate within the required time. For improving the gas generating velocity of the metal azide, a considerable amount of heat must be supplied to the metal azide. For instance, in order to improve the gas generating velocity of the metal azide, an oxidizing agent or mixture consisting of an oxidizing agent and reducing agent may be added thereto. The amount of heat to be supplied varies with the required gas generating velocity, and the choice of the metal azide (the sensitivity, i.e., the decomposition temperature thereof), etc., but it is, in any event, a considerable amount. If the supplied amount is insufficient, there can not be obtained a sufficient gas generating velocity to inflate the bag reliably with the sufficient high velocity. On the contrary, if the amount of supplied heat is sufficient, the temperatures of both the generating gas and the generating combustion residue are considerably elevated, so that the passenger and the bag will be burnt. Therefore, if a chemical composition comprising a metal azide is employed, it is absolutely necessary to provide a means for removing the produced heat. For instance, if strontium azide, which is easily decomposed because of its lower composition temperature and its lesser activation energy of decomposition, as compared with sodium azide, is employed as the molecular nitrogen gas generating compound in admixture with potassium perchlorate, there must be added potassium perchlorate in an amount of about 5 wt.% based on the amount of the strontium azide. In this case, the temperature of the generated gas will be about 1,200°C. If a composition comprising sodium azide is used, the temperature of the generated gas will easily reach a temperature higher than 1,200°C. Therefore a large amount of heat must be removed from that gas to provide a gas of an adequate low temperature. Heat exchange with a substance having a large heat capacity, or an endothermic phase change or an endothermic chemical change with some substance can be considered as a possible method for removing heat. However, removing the heat is considered to be very difficult, because the gas is generated with an extremely high velocity, the means for removing the heat must be very compact, so that the contact time of the gas with the substance which is subjected to the heat exchange, or the endothermic phase change or the chemical change will be very short.

Accordingly, lowering the temperature of the generated gas is one of the most important technical problems to be solved in order to provide a gas generating system using a chemical composition comprising a metal azide.

However, there has not been heretofore known such a compact means, by which such the high temperature of the generated gas with a high velocity could be lowered to the extent of about 1,000°C.

On the other hand, the composition comprising a metal azide produces, as the combustion residue

thereof, a considerable metal residue which is very active and temperature of which is relatively high. For example with respect to barium azide and strontium azide, the metal content amounts to about 60 wt.%, and 50 wt.% respectively; accordingly, the gas of 70 liter normally generated therefrom includes about 143 g and 91 g of the metal powder respectively.

Therefore, the most important technical problem to be solved in producing the gas generating system is to provide a very compact and light means for making it possible to collect substantially completely the combustion residue within the gas generating system. However, this is not easily done, considering that a filter layer composed of very fine interstices is required for a complete collection of considerable fine powdered residue, there is high ratio of clogging with fine powdered residue of the fine interstices of the filter layer required for making the apparatus compact, and the very rapid generation velocity of gas required for the rapid inflation of the bag raises considerably the inner prossure of the gas in the vessel. For instance, if the gas for expanding a bag of 70 liters in about 30 milliseconds is passed through an area of 100 cm², the over all passing velocity thereof amounts to 230 m/sec., and the average time required to pass through the filter layer of 1 cm in thickness is about 0.043 millisecond. An instaneous passing velocity much greater than 230 m/sec. and a passing time much shorter than 0.043 milliseconds are needed in some instances.

The calculation is shown as follows:

(1)　100 cm² × 230 m/sec. × 30 milliseconds = 100 cm² × 23000 cm/sec.

$\times \frac{30}{1000}$ sec. = $1.0 \times 2.3 \times 3.0 \times 10^{2+4+1-3}$ cm³ = $6.9 \times 10^4$ cm³

= 69000 cc ≒ 70 liter

(2)　1 cm/230 cm/sec. = 1 cm/23000 cm/sec. = $\frac{10}{2.3} \times 10^{-1-4}$ sec.

= $4.34 \times 10^{+5}$ sec. = 0.0000434 sec. = 0.0434 millisecond.

Unexpectedly, we have now found that a layer composed of a number of metal wire gauzes suffices to collect substantially completely the fine powdered residue, and simultaneously suffices to lower remarkably the temperature of the generating gas by about 1,000°C down to such a temperature at which the passengers and the bag are not injured.

## SUMMARY OF THE INVENTION

The present invention relates to a gas generating system for the inflation of a protective bag to cushion a passenger from impact with the structrue of a high speed vehicle comprising (1) a chamber surrounded by a wall composed at least in part of a layer composed mainly of a plurality of metal wire gauzes, the layer forming the passageway of the generating gas, (2) a gas generating chemical composition enclosed in the chamber, comprising at least one oxiding agent, or combustion compositions comprising at least one oxidizing agent and at least one reducing agent, and at least one member selected from the group consisting of alkali metal azides, alkaline earth metal azides and hydroxy metal azides having the general formula M(OH)m(N3)n, wherein M represents magnesium, calcium, strontium, zinc, boron, aluminum, silicon, tin, titanium, zirconium, magnesium, chromium, cobalt or nickel, m plus n represents atomic valency of M, and m and n represents a positive number respectively, and (3) at least one ignition tube for igniting the chemical composition enclosed in the chamber.

It has been unexpectedly found that a thin layer of plurality of metal wire gauzes, which provide the passageway of the generating gas, can remarkably lower the temperature of the gas, e.g., from about 1,200°C down to about 200°C, and simultaneously can substantially collect and retain the fine powdered combustion residue.

The thin layer is characterized by a heat capacity above about 5 cal/°C per 1 mol of the generated nitrogen gas, whereby the layer can lower the temperature of the generating gas by about 700°C or higher. The ratio of the total surface area to total volume of the all wires of the layer is in the range of 150–400 cm²/cm³, the fractional voids of the entire layer is in a range of 60–90%, and the thickness of the layer is in a range of 0.3–3.0 cm.

It has been further, found that a chemical composition consisting essentially of at least one metal selected from the group consisting of boron, zicronium, aluminum and magnesium, and at least one oxidizing agent selected from the group consisting of lithium perchlorate, sodium perchlorate, potassium perchlorate, ammonium perchlorate and potassium nitrate can be most preferably employed as the chemical composition for activating the ignition tube with no ignition lag. Packing the gas generating chemical composition and the ignition tube with a metal foil or closing the passageway of the generating gas with a metal foil is effective to hasten the generation of gas. The surface of the chamber is substantially covered with a thick sheet of a silicon resin to prevent burning of the passenger and the bag.

## BRIEF DESCRIPTION OF THE DRAWINGS

FIG. 1a and FIG. 1b are two views of a cylinder type gas generating system which represents one embodiment of the present invention. FIG. 1a is a partial sectional view, the left half being a plane view, and the right half being a lateral sectional view along line B—B' in FIG. 1bFIG. 1b is a side view, the left half being a side view and the right half a vertical sectional view along line A—A' in FIG. 1a. FIG. 2 is a side view of a long cylinder type gas generating system similar to the system shown in FIG. 1, wherein a part thereof is a longitudinal view.

FIG. 3 is a vertical sectional view of a hemisphere type gas generating system which is one embodiment of the present invention.

FIG. 4 is a vertical sectional of another embodiment of the hemisphere type gas generating system.

FIG. 5 is a vertical sectional view of a thin chamber type gas generating system.

FIG. 6 is a vertical sectional view of a gas generating system arranged in a protective bag.

FIG. 7 is a vertical sectional view of one embodiment of the ignition tube used in the gas generating system.

FIG. 8 (a)(b) and (c) are longitudinal sectional views of one embodiment of a gas generating system arranged with a sheet of a silicon resin fixed in the bag which is equipped to a steering wheel.

FIG. 9 shows various views of metal wire gauzes. (a) is a plane view of a plain weave of the metal wire guaze. (b) is a plane view and a sectional view of a tatami-like weave of the metal wire gauze. (c) is a plane view and a sectional view of twilled tatami-like weave of the metal wire gauze. (d) is a plane view and a sectional view of a twilled mushirolike weave. (e) is a plane view and a sectional view of mushiro-like weave.

FIG. 10 is a curve showing the relationship between lowering temperature of the gas (°C) and the heat capacity of wire gauzes required to cool 1 mol (or 1 liter) of the generated nitrogen gas.

FIG. 11 is a curve showing the relationship between the amount of combustion residue escaping from the system and the ratio of total surface area of wires of the layer / total volume of wires of the layer.

## DETAILED DESCRIPTION

The gauze used in the invention is a metal wire gauze made of a plain weave of 5 to 350 mesh, twilled weave having an interstice range of same order as in a plain weave, tatami-like weave, twilled tatami-like weave, mushiro-like weave, or twilled mushiro-like weave, having interstices corresponding to 5 to 350 mesh of plain weave, or wool or knitting of metal wire. A wire made of monofilament or ply filaments can be employed.

The choice of material for the metal wire gauze is based on its mechanical strength and its heat resistance property. Useful metals include iron, copper, aluminum, or alloys thereof. Iron, especially stainless steel is preferable.

Determination of the range of kinds and repeating number of wire gauzes composing the layer required to accomplish the object of the invention is essentially very difficult. However, it has been found that the construction of the filter layer can be carried out by determining the following four characteristics. First, total weight of the filter layer is measured. As is clearly understood by the Examples described hereinafter, we have found that a clear correlation exists between the temperature lowering the generating gas and the heat capacity of the total wire gauzes of the filter layer required for lowering the temperature. The correlation curve is definite regardless of the kind and the amount of the gas generating chemical composition, and regardless of properties of the wire gauzes of the filter layer. FIG. 10 shows the correlation curve. The curve shows that in order to lower the temperature of 1 mol (1 liter) of the generating nitrogen gas by about 700°C, there is required a layer of wire gauzes having a heat capacity of about 5 cal./°C (0.223 cal./°C), and in order to lower the temperature by 1,000°C there is required a layer of wire gauzes having a heat capacity of above 10 cal./°C 1 mol. of $N_2$ (0.446 cal./°C/ liter of $N_2$). Namely, the weight of the wire gauges of the layer can be easily obtained by dividing the value of the heat capacity by the specific heat of the metal forming the wire gauzes.

Second, the average diameter of all of the wires of the wire gauzes of the layer must be so selected that the ratio of total surface area of the wires of the layer to the total volume of the wires of the layer is in the range of 150–400 $cm^2/cm^3(cm^{-1})$. If the value is below 150 $cm^{-1}$ too much residue passes through the layer, and if the value is above 400 $cm^{-1}$ the layer tends to be broken. This limitation is based on the curve shown in FIG. 11 obtained from a plurality of tests using various combinations of wire gauzes for the layer.

Third, the average void fraction of the layer must be selected in the range of 60–90%, preferably 65–85%. The layer tends to be broken if the value is below 60%. The void fraction above 90% causes the system to bulk in vain. In the layer, the void fraction of the layer is more important than the size of the interstices of the wire gauzes from the reason given hereinafter.

Fourth, the thickness of the layer must be in the range of 0.3–3.0 cm, preferably 0.5–2.0 cm. An amount below 0.3 cm tends to cause a leakage of the residue from the layer when the layer is not destroyed.

The object of the invention is accomplished by using the layer characterized by said four characteristics. However, it is preferable that metal wire gauzes made of plain weave in various kinds of mesh sizes are arranged in such a way as that the mesh size becomes progressively larger from the inside to the outside of the gas generating chamber, and especially, combinations of the metal wire gauzes which are alternatively formed of a smaller mesh and a larger mesh in the mesh size ratio of more than 1.3, preferably of 1.5 to 10, are inserted in some places.

Gauzes made of tatami-like weave, twilled tatami-like weave or mushiro-like weave or twilled mushiro-like weave are conveniently positioned on the outside of the gas generating vessel in order to collect the residue completely. These weaves appear like as a weave having no interstices in its plane view, so that the gas must pass through circuitous routes vertical to the surface thereof from its front surface to its back surface, thereby reducing the velocity of the generating gas. The void fraction of tatami-like, twilled tatami-like, mushiro-like, or twilled mushiro-like weave is comparatively smaller than that of plain weave. However, this is not a matter of concern, because the pressure elevation based on these weaves arranged on the outside of the layer is comparatively small, because the amount of residue passing through the outside of the layer is already decreased. Since velocity drop of the gas depending on the weaves other than plain weave is considerable, final leakage of the residue can be prevented with wire gauzes of these weaves which are stronger than the gauzes of plain weave. In fact, the strength of the wire gauze of plain weave above 350 mesh is insufficient.

In the collection of the combustion residue, which is a phenomena which is different from the phenomena in ordinary filtration of solid powders, for example, the minimum size of interstices of the wire gauzes required to collect the residue is less definite than in the case of ordinary filtration; for example, the poor filtering effect

using wire gauze of smaller mesh size can be considerably improved by sequential arrangement of the same wire gauzes. It also seems that both the above-said phenomenon and the phenomena enabling the complete collection of the residue under severe conditions are based on the fact, that strontium metal, barium metal, sodium metal, etc. are generated almost in a liquid state and even in a gaseous state in some cases, because the melting points of strontium, barium, and sodium are 770°C, 704°C, and 97.7°C respectively, and the boiling points of Sr, Ba and Na are 1,384°C, 1,638°C and 892°C respectively, and the temperature of the generating gas is higher than about 1,000°C. The metal residue is easily adhered to the wires of wire gauzes because of its liquid state, and the residues passing through fine interstices of wire gauzes are then trapped in voids of the layer due to the velocity drop and the cooling thereof. For this reason the residue can be easily collected and even a comparatively minute interstice is not clogged with the residue because of its liquid state. The particles which lose their high velocity are cooled and deposited in the voids of the layer. This is the reason why the flow resistance is not so elevated in spite of the high velocity. For this reason minimum mesh size is not such a strict requirement as in the filtration of solid particles.

In fact, when the amount of the incorporated oxidizing agent is too small and a non-combustive solid substance is generated in a large amount, the flow resistance of generating gas is so markedly elevated as to destroy the filter layer in spite of the very slow generating velocity of gas. This phenomenon is considered to be an indirect proof of the aforesaid observations.

The most important feature of the gas generating system of the present invention resides in the above-said filter layer composed of a plurality of metal wire gauzes. The vigorous standards required for the system of the present invention is therefore accomplished by completion of the said means for collecting the residue and lowering the gas temperature.

The layer composed primarily of a number of metal wire gauzes is most effective when it is used in combination with the gas generating chemical composition comprising the following metal azides. The composition comprises at least one member selected from the group consisting of alkaline earth metal azides, alkali metal azides and hydroxy metal azides having the general formula $M(OH)m(N_3)n$, wherein M represents magnesium, calcium, strontium, zinc, boron, aluminum, silicon, tin, titanium, zirconium, maganese, chromium, cobalt or nickel, $m$ plus $n$ represents atomic valency of M, and $m$ and $n$ represent a positive number respectively, and at least one member selected from the group consisting of oxidizing agents and combustion compositions comprising at least one oxidizing agent and at least one reducing agent.

The useful oxidizing agents include e.g., lithium perchlorate, potassium perchlorate, potassium chlorate, ammonium perchlorate, sodium perchlorate and potassium bromate; nitrate such as potassium nitrate or barium nitrate; metal peroxide such as lithium peroxide, sodium peroxide, potassium peroxide, barium peroxide, lead peroxide; metal oxide such as maganese dioxide, ferric oxide ($Fe_2O_3$), ferrosoferric oxide ($Fe_3O_4$), trilead tetraoxide, chromium trioxide. The reducing agents include metals such as zirconium, magnesium, boron, aluminum, silicon, ferro-silicon, titanium, maganese, etc.

Of all metal azides alkali metal azide and alkaline earth metal azides can be employed because of their appropriate alkali metal azide and sensitivity to heat and shock, i.e., their appropriate temperature of decomposition. By introducing the hydroxy group into metal azides to replace a part of the metal with the hydroxy group, there can be also employed those metals which can not otherwise be employed as the metal azide because of its oversensitiveness to heat and shock. The hydroxy metal azides are represented by the general formula $M(OH)m(N_3)n$, e.g., $Mg(OH)_{1.2}(N_3)_{0.8}$, $Ca(OH)_{1.1}(N_3)_{0.9}$, etc. The hydroxy metal azides can be prepared as a solid powder by a process comprising adding dropwise conc. $H_2SO_4$ to the boiling sodium azide aqueous solution to generate hydrogen azide, causing the hydrogen azide to be dissolved in cooled water, then adding a metal hydroxide to the resulting aqueous solution, and thereafter evaporating water and an excess of hydrogen azide therefrom.

We have further found that the chemical composition comprising at least one oxidizing agent and at least one reducing agent, and especially strontium azide or barium azide is particularly suitable when employed in combination with the gas generating system of the present invention characterized by the layer consisting essentially of plurality of metal wire gauzes.

Alkali metal azides such as sodium azide, potassium azide or lithium azide can be of course employed in the gas generating system of the present invention, but their decomposition temperatures are relatively high, and their activation energies of decomposition are comparatively great, so that the decompositions thereof with such a controlled velocity as to cause the bag to inflate in a time of the order of 20–60 milliseconds can be effected only when a sufficient amount of an oxidizing agent is incorporated. Since a lot of heat of oxidation is produced in such the decomposition, the temperature of the generating gas is naturally very high. Accordingly, in the case of using sodium azide, a large device for lowering the gas temperature is required, and in addition, since very active and harmful sodium metal or sodium oxide are produced, there will be required a means for their inactivation.

Of alkaline earth metal azides, calcium azide lacks the necessary thermal stability, i.e., the decomposition temperature thereof is too low, and magnesium azide is too sensitive to moisture. Strontium azide or barium azide is preferably employed, because the decomposition temperature and the activation energy of decomposition thereof have values preclude a lack of thermal stability in its actual use, but an addition of a small amount of oxidizing agent gives rise to a quick decomposition of the composition. Especially, strontium azide is most preferable, because of its non-toxic property.

Moreover, the addition of a reducing agent such as boron, zirconium, aluminum, magnesium or titanium in a small amount ranging from 0.1 to 10 wt.% based on the amount of metal azide can further improve the ignition property of the composition, so that the amount of oxidizing agent to be added can be further decreased. Consequently, the gas at a relatively low temperature (below 1,200°C) can be generated by the decomposition of the composition consisting of strontium azide or barium azide and an oxidizing agent and a reducing agent.

Thus, a gas of a relatively low temperature is generated with a reasonable velocity from the composition consisting mainly of strontium azide or barium azide. The combustion residue, i.e., strontium metal or barium metal is not so active, besides, strontium metal is non-toxic. And, as mentioned above, the filtering means composed mainly of a thin layer of a number of metal wire gauzes is surprisingly effective to collect the strontium metal substantially completely, and simultaneously it is also effective to lower the temperature of the generating gas, so that the temperature is lowered from a temperature of 1,000°–1,200°C to a temperature of 50° to 400°C, which is a useful temperature range for expanding the bag.

The device composed of a thin layer of metal wire gauzes which is the essential feature of the gas generating system of the present invention can thus perform a special effect in combination with using the composition consisting mainly of strontium azide.

The preferable oxidizing agent incorporated with strontium azide is tri lead tetroxide or potassium perchlorate, and the reducing agent is potassium perchlorate, potassium nitrate, ferric oxide, ferrosoferric oxide, aluminum, boron, magnesium, silicon or zirconium. The preferable amount of potassium perchlorate added to strontium azide is in a range of 3–12 wt.%. The preferable amount of the reducing agent is in a range of 0.1–10 wt% based on the amount of strontium azide.

The object of the present invention to provide a completed gas generating system can be thus accomplished by a very simple system comprising a chamber surrounded by a wall composed at least in part of a layer composed mainly of a plurality of metal wire gauzes so that the layer forms the passageway for the generating gas. The layer has a heat capacity of above 5 cal/°C per 1 mol. of nitrogen gas and a ratio of total surface area to total volume of all wires of the layer in the range of 150–400 $cm^2/cm^3$ a void fraction of the whole layer in the range of 60–90%, and having a thickness of the layer in the range of 0.3–3.0 cm. The gas generating chemical composition consisting mainly of above-said metal azides and hydroxy metal azides, especially strontium azide which is enclosed in the chamber and at least one ignition tube for igniting the chemical composition are positioned and arranged in the chamber.

The molecular nitrogen gas generating chemical composition is preferably employed in the form of granules, tablets or pellets, especially in the form of tablets made of well mixed powdered components thereof, otherwise components included therein become separated from one another by vibrations of a long period in an automobile, so that a fluctuation of gas generating velocity is liable to be caused. Therefore, it is better that the composition is molded by compression to tablets having a definite durable shape which are not crumbled even by severe vibrations and severe temperature changes occurring for a long period in an automobile.

For the ignition tube used in the gas generating system there are required some special attributes which are different from the attributes of prior ignition tubes, such as electric detonators. Namely, a very quick ignition must be effected with an absolute reliability and with no ignition lag. It takes at least 5 milliseconds until the crash is detected from the moment of the crash, and the bag must be inflated and deployed in a period of about 15–55 milliseconds or less. An electric current flows into an electric bridge of the ignition tube from a sensor which perceives a crash thereby heating bridge, so that the chemical composition in the ignition tube is ignited by heat to generate a combustion gas. Then, the pressure of the generated combustion gas causes the ignition tube to break and sprout a flame to outside of the ignition tube, so that the flame ignites the gas generating composition. The gas generating chemical composition thus ignited burns away to generate a gas, so that the gas causes the bag to inflate. Therefore, the combustion of the chemical composition in the ignition tube must be reliably effected in a very short time.

Besides, the chemical composition in the ignition tube must be stable for a long period under conditions of severe vibration and temperature. The chemical composition in the ignition tube must be a composition which can ignite the gas generating chemical composition so as to generate the gas without any shock wave formation.

We have also found that the chemical composition in the ignition tube can add a cyano compound to the combustion residue, if a carbon containing compound is employed. Accordingly, it must be selected not so as to add a cyano compound to the combustion residue.

As the chemical composition for the ignition tube having above-said attributes, it has been found that a useful chemical composition comprises at least one metal selected from the group consisting of boron, zirconium, aluminum and magnesium, and at least one oxidizing agent selected from the group consisting of lithium perchlorate, sodium perchlorate, patassium perchlorate, ammonium perchlorate and potassium nitrate.

The preferable ratio of the amount of the metal to the amount of the oxidizing agent is generally in a range of its oxidation-reduction equivalent, but may be sometimes different from the oxidation-reduction equivalent depending on the choice of oxidizing agent and the reducing agent.

The amount of the chemical composition in one ignition tube varies with the chemical composition itself and the amount of the gas generating composition and the number of the used ignition tubes, but is in the range of 0.02 to 2g. per one ignition tube.

The chemical composition in the ignition tube is used in any form of powdered mixture or granule.

The chamber of the gas generating system of the present invention may be in any form, e.g., a cylindrical chamber, a convex chamber, a thin chamber, etc. For adapting to a steering wheel or other structure of an automobile, the bottom of the chamber is preferably a flat plate. The wall of the chamber which forms the passageway of the generating gas can be made of only a layer of a plurality of metal wire gauzes, or both a plate having a number of perforations and the layer of metal gauzes.

The inside of the perforated plate wall or the layer of metal wire gauzes can be lined with a film, sheet, or foil preferably a metal foil such as aluminum foil, so as to close the passageway of the generating gas. The lined foil or sheet suffices to increase inner pressure of the chamber at an initiation period after ignition, accompanied with no special increase of the inner pressure of the chamber at the peak of the gas generation, so that

the gas generates with a greater velocity and no gas generation lag occurs.

One or more of the ignition tubes can be used, and a number of bags or boxes made of a metal sheet or foil in which an ignition tube and an amount of the gas generating chemical composition are packed, may be employed. The bag or box serves to prevent the change of the composition caused by contact with the wall, atmospheric moisture, etc., as well as above-said effect to increase the gas generating velocity.

The reason why the metal foil or sheet is used is based on the fact that the metal foil or sheet does not add a toxic substance to the combustion gas and combustion residue, while other sheets or films of organic polymers do.

The chamber is generally made of a metal or an alloy, because of its mechanical strength, thermal stability and easy availability. Since the metal chamber just after the bag is inflated is still at a high temperature, it must be covered with a substance for protecting the passenger and the bag from burning. We have found that a thick sheet made of a silicon resin is very effective. The silicon resin sheet is positioned on a part of the wall which is readily contacted with the passenger and the bag.

## DESCRIPTION OF THE PREFERRED EMBODIMENTS

In FIG. 1, on a circular plate 8 having a column 9 in the center are placed an inner cylinder 4 having a plurality of perforated holes 6, then a cylindrical layer of a number of metal wire gauzes 1 between the inner cylinder 4 and an outer cylinder 5 having a plurality of perforated holes 7. A circular cover plate 10 is placed on the cylinders and is fixed with a screw 11 to column 9 of the plate 8. In this case, the heights of the column 9, inner cylinder 4, the wire gauze layer and the outer cylinder are all the same. 3 is an ignition tube and 2 is tablets of a gas generating chemical composition. The cylinder 4 or 5 can be of course, omitted.

FIG. 2 is a long cylinder type system similar to FIG. 1.

In FIG. 3, the passageway of the generating gas is composed of only a layer 1 of a plurality of metal wire gauzes. The inside and outside of the layer are reinforced with a thick strong metal wire gauze. 1 is the layer, 2 is the tablets and 3 is the ignition tube. In FIG. 4, the passageway is composed of both the layer and a perforated plate. FIG. 5 represents a thin chamber type gas generating system. In FIG. 6, the ignition tube and the tablets are packed in a box composed of a metal sheet 12, and the inner perforated wall is lined with a metal foil 13. 14 represents a protective bag.

In FIGS. 7, 15 represents platinum wire, 16 a tricinate cube, 17 an ignition chemical composition, 18 wall of the ignition tube, and 19 a stopper.

In FIGS. 8, 20 represents a cover made of a silicon resin, and 21 represents a steering wheel.

## EXPERIMENTAL EXAMPLE

210 g and 320 g of tablets of thickness 2 mm and diameter 5 mm of gas generating composition consisting of 85 wt. parts of strontium azide, 12 wt. parts of ferric oxide and 3 wt. parts of boron were filled in a vessel such as shown in FIG. 1 and FIG. 2, in which two ignition tubes containing 0.2 g of ignition chemical composition consisting of 85 wt. parts of potassium nitrate and 15 wt. parts of boron, were equipped. The layer of wire gauzes shown in Table 1 were adapted to the vessel. The nylon bag was inflated by means of the vessel.

The temperature in the inner cylinder and in the bag were measured by a platinum-platinum rhodium thermocouple. The results are shown in Table 2, and are plotted in FIG. 10. In FIG. 10, a clear correlation between lowering temperature of the generating gas and heat capacity of wire gauzes of the layer can be seen. FIG. 10 shows the curve representing heat capacity (cal/°C) of the layer required to lower the temperature of the generating nitrogen gas of 1 mol (or 1 liter).

## EXAMPLE 1

100 wt. parts of barium azide, 7 wt. parts of zirconium and 7 wt. parts of potassium perchlorate were mixed in their powdered state, and the resulting mixture was subjected to compression molding to make tablets of a diameter 5 mm and a thickness 3 mm. A 150 c.c. iron vessel was equipped with an intermediate partition wall having 200 circular holes of a diameter of 3 mm perforated in uniform intervals. A tricinate squib (ignition tube) and 200 g. of the tablets were positioned on the bottom of the vessel as shown in FIG. 5.

On the top of the vessel was fixed a layer of 15 gauzes of stainless steel wire gauze of plain weave of 100 mesh. Then the vessel was fixed in a nylon bag having a volume of 70l. Air was purged from the bag to fold it, and thereafter the squib was ignited to inflate the nylon bag. The metal wire gauzes fixed on the top of the vessel were taken apart to measure the amount of the metal powder adhered thereon. There was found a value corresponding to 97.3% of the theoretical amount to be produced. In this case, the theoretical amount was 127.6 g.

The gas in the nylon bag was collected by an injector to analyze the gas composition using gas chromatography. The results are shown in Table 3.

## EXAMPLE 2

In the same manner as in Example 1, except that the layers of stainless steel wire gauzes of plain weave shown in Table 4 were used instead of the 15 wire gauzes of plain weave of 100 mesh, the nylon bags were inflated to collect the produced metal power. The amount of the collected metal powder is shown in Table 4.

## COMPARATIVE EXAMPLE 1

In the same manner as in Example 1, the nylon bag was inflated except that 100 g of glass wool was employed instead of the metal wire gauzes. A large hole of a diameter about 3 cm was burned through the bag, so that the bag was not inflated. In the vessel, the glass wool melted in several places to form holes. The glass wool was removed to measure the amount of the metal residue adhered to the glass wool. The amount thereof was 20 g.

The test was repeated using 150 g. of the glass wool, but the bag was not inflated because of burn holes.

The amount of the metal residue adhered to the glass wool was 25 g.

## COMPARATIVE EXAMPLE 2

In the same manner as in Example 1, the nylon bag was inflated, except that 100 g. of porcelain Raschig

rings cylinders having an outer diameter of 3 mm, an inner diameter of 1.5 mm and a height of 3 mm was employed.

The Raschig rings were taken out to measure the amount of the metal residue adhered thereto. The amount thereof was 25 g.

The test was repeated using 200 g. of the Raschig rings. An iron plate of a thickness of 2 mm. of the top of the vessel was broken and the Raschig rings were thrown away.

## EXAMPLE 3

In the same manner as in Example 1, the nylon bags were inflated except that the layers of metal wire gauzes of plain weave shown in Table 5 were employed. The results obtained are shown in Table 5.

## EXAMPLE 4

In the same manner as in Example 1, the nylon bags were inflated except that the layers of the metal wire gauzes of plain weave shown in Table 6 were employed, nylon bags were inflated. The obtained results are shown in Table 6.

## EXAMPLE 5

100 wt. parts of barium azide, 7 wt. parts of zirconium and 7 wt. parts of potassium perchlorate were mixed in their powdered state. The resulting mixture was subjected to compression molding to make tablets of a diameter of 5 mm. and a thickness of 3 mm. In the lower part partitioned with a plate having 200 perforated holes of a diameter of 3 mm. as shown in FIG. 6, there was charged 150 g. of the tablets. A layer of iron wire gauzes of plain weave shown in Table 7. was used. A squib in the vessel was ignited to generate the gas to inflate a 70 liters nylon bag. The obtained results are shown in Table 7.

## EXAMPLE 6

In an inside cylinder of a double cylindrical vessel, the inner side wall of which is perforated with 800 holes of a diameter 2 mm. and is lined with an aluminum foil of a thickness 40 $\mu$ in its inside, and the outer side wall of which is perforated with 160 holes of a diameter 9 mm, was positioned an ignition tube, in which 0.2 g. of an ignition composition consisting of 15 wt. parts of boron and 85 wt. parts of potassium nitrate. The cylinder was charged with 210 g. of tablets of a diameter 5 mm. and a thickness 2 mm. of the gas generating composition consisting of 80 wt. parts of barium azide, 1 wt. part of boron, 19 wt. parts of trilead tetroxide and 1.6 wt. parts of styrene-butadiene rubber. Between the inner side wall and the outer side wall, was provided a layer of stainless-steel wire gauzes of plain weave, as shown in Table 8. The vessel was adapted in a folded nylon bag of about 70 liters in volume. A direct current of about 2 ampere was flowed into the ignition tube to ignite the ignition composition and then the gas generating composition, so that the gas was generated to inflate and deploy the bag.

According to a pressure-time curve in the bag and in the inner cylinder measured by a strain meter, it took 32 milliseconds until the inner pressure of the bag amounted to 1.2 kg/cm$^2$ abs. and the maximum pressure in the inner cylinder amounted to 35 kg/cm$^2$.

In order to determine the amount of the combustion residue which was passed through the layer of wire gauzes and escaped into the bag, all of the gas in the bag just after being deployed was sucked by a vacuum pump with a suction velocity 10 liters/min. to pass through a milli-pore filter paper for measuring dust, and thereafter the amount of the residue collected to the filter paper was weighed to yield 200 mg.

In this case, the weight of the layer of wire gauzes was 231.4 g. in total, and it was a rate of 1.1 g. per 1 g. of the gas generating composition. The heat capacity of the filter layer based on the amount of the composition which generates 1 liter of nitrogen gas was 0.478 cal/°C, the fractional void of the filter layer was 76.8%, and the ratio of total surface area of wires to total volume of wires of the filter layer was 284 (cm$^{-1}$). The thickness of the filter layer was about 11 mm.

The inside temperature of the inner cylinder and the bag were measured respectively by thermocouples to yield 1100°C and 240°C ; accordingly, a temperature lowering of about 850°C was obtained by passing through the layer of metal wire gauzes.

## EXAMPLE 7

In the same manner as in Example 6, the bag was inflated except that the stainless-steel wire gauzes shown in Table 9 were employed. The heat capacity of the filter layer based on the amount of the composition which generates 1 liter of nitrogen gas was 0.598 cal/°C. The fractional void of the layer was 71.4%. The ratio of total surface area of wires to total volume of wires, of the layer was 184 cm$^{-1}$.

It took 32 milliseconds until the inner pressure of the bag amounted to 1.2 kg/cm$^2$ abs., and the maximum pressure thereof was 1.26 kg/cm$^2$ abs. The time until it reached the maximum pressure was 34 milliseconds. The maximum pressure in the inner vessel was 37 kg/cm$^2$. The residue flowed into the bag was 70 mg. The maximum temperatures of inside of the inner cylinder, and in the bag were 1150°C and 170°C, respectively.

## EXAMPLE 8

In the same manner as in Example 6, the bag was deployed except that 160 g. of tablets of thikness 2 mm. and diameter 5 mm. consisting of 95 wt. parts of strontium azide, 4 wt. parts of potassium perchlorate, and 4 wt. parts of boron was employed as the gas generating composition.

The time until the inner pressure of the bag amounted to 1.2 kg/cm$^2$ abs. was 26 milliseconds, and the maximum pressure thereof was 1.4 kg/cm$^2$ abs. The time until it amounted to the maximum pressure was 50 milliseconds. The maximum pressure of inside of the inner cylinder was 41 kg/cm$^2$. The residue escaping into the bag amounted to 250 mg. The maximum temperature of inside of the inner cylinder and in the bag were 1,250°C and 300°C, respectively.

## EXAMPLE 9

In the same manner as in Example 6, the bag was deployed except that the wire gauzes in Example 7 was employed. It took 26 milliseconds until the inner pressure of the bag amounted to 1.2 kg/cm$^2$ abs. The maximum pressure of the bag was 1.28 kg/cm$^2$, and the maximum pressure inside of the inner cylinder was 43 kg/cm$^2$. The inside temperatures of the inner cylinder and the bag were 1,220°C and 180°C, respectively. The

amount of the residue which escaped into the bag was 100 mg.

## EXAMPLE 10

In an inside cylinder of a double cylindrical vessel, the inner side wall of which is perforated with 1,300 of holes of a diameter 2 mm, and the outer side wall of which is perforated with 168 of holes of a diameter of 9 mm, was positioned an ignition tube, in which 0.2g. of an ignition composition consisting of 40 wt. parts of zirconium and 60 wt. parts of potassium perchlorate, and was filled 180 g. of tablets of a thickness 2 mm, and a diameter 5 mm. consisting of 92 wt. parts of strontium azide, 2 wt. parts of zirconium and 4 wt. parts of potassium perchlorate. Between the inner side wall and the outer side wall, was positioned a layer of stainless-steel wire gauzes shown in Table 10. The vessel was adapted in a folded nylon bag of a volume 70 liter. The bag was inflated.

The heat capacity of the filter layer based on the amount of the composition which generates 1 liter of nitrogen gas was 0.93 cal/°C. The void fraction of the layer was 76.1%. The ratio of total surface area of wires to total volume of wires of the layer was 284 $cm^{-1}$.

It took 30 milliseconds until the inner pressure of the bag amounted to 1.2 $kg/cm^2$ abs. The maximum pressure was 1.21 $kg/cm^2$ abs. The maximum pressure of the inner cylinder was 32 $kg/cm^2$. The residue flowed into the bag was 130 mg. The maximum temperature of the inside of the inner cylinder and the bag were 1,400°C and 220°C respectively.

## EXAMPLE 11

In the same manner as in Example 10, except that the wire gauzes shown in Table 11 were employed, the bag was inflated.

The time until the inner pressure of the bag amounted to 1.2 $kg/cm^2$ abs. was 30 milliseconds. The maximum pressure was 1.12 $kg/cm^2$ abs. The maximum pressure in the inner cylinder was 35 $kg/cm^2$. The residue flowed into the bag was 50 mg. The maximum temperature of the inside of the inner cylinder and the bag were 1,310°C and 100°C. respectively.

The heat capacity of the filter layer based on the amount of the composition which generates 1 liter of nitrogen gas was 1.23 cal/°C. The fractional void of the filter layer was 67.7%. The ratio of total surface area of wires to total volume of wires of the layer was 243 ($cm^{-1}$).

## EXAMPLE 12

In the same manner as in Example 11, the nylon bag was inflated except that 140 g. of tablets of thickness 1.8 mm. diameter 4 mm. consisting of 85 wt. parts of sodium azide and 15 wt. parts of potassium perchlorate, and the wire gauzes having a heat capacity of about 1.38 kcal/°C per 1 liter of the generated $N_2$ gas was employed.

It took 35 milliseconds until the inner pressure of the bag amounted to 1.2 $kg/cm^2$ abs. The maximum temperature in the inner cylinder and in the bag was 1,550°C and 280°C respectively.

"Mesh" are all "Tyler mesh" in the above description of this invention.

Table 1

| Experiment No. | | 1,2 | 3,4 | 5,6 | 7,8 | 9,10 | 11 | 12 |
|---|---|---|---|---|---|---|---|---|
| Type of vessel | | FIG. 1 | FIG. 1 | FIG. 1 | FIG. 1 | FIG. 1 | FIG. 2 | FIG. 2 |
| Amount of Tablets | | 210 g. | do. | do. | do. | do. | 320 g | do. |
| construction of wire gauzes (stainless steel plain weave) | | | | | | | | |
| 1st layer (inside) | Combination of mesh(1 unit) | 20–40–100 | do. | do. | do. | do. | do. | do. |
| | No.of wire | (27)–(36)–(42) | do. | do. | do. | do. | do. | do. |
| | No.of units | 3–4 | do. | do. | do. | do. | do. | do. |
| 2nd layer | Combination of mesh(1 unit) | 60–100 | twilled mushiro | do. | 60–100 | do. | do. | twilled mushiro |
| | No.of wire | (37)–(42) | — | — | (37)–(42) | do. | do. | — |
| | No.of units | 3–4 | 2 | 4 | 3–4 | 3–4 | 4 | — |
| 3rd layer | Mesh : No.of turn | 200 : 1 | 10:1 | — | — | 200:1 | 200:1 | — |
| 4th layer | Mesh : No.of turn | 100 : 1 | — | — | — | 300:1 | 300:1 | — |
| 5th layer | Mesh : No.of turn | 10 : 1 | — | — | — | 10:1 | — | — |
| amount of wire gauzes | | | | | | | | |
| 1st layer | (g) | 139.8 | do. | do. | 179.0 | 100.0 | 362 | do. |
| 2nd – 5th layers | (g) | 91.6 | 73.2 | 146.4 | 76.5 | 91.6 | 245 | 436 |
| Total | (g) | 231.4 | 213.0 | 286.2 | 255.5 | 191.6 | 607 | 798 |
| heat capacity of wire gauzes required to generate 1 mol(1/liter) of $N_2$ gas in normal state | | | | | | | | |
| | (cal/oC)/mol $N_2$ | 6.07 | 5.60 | 7.52 | 6.71 | 5.03 | 15.9 | 21.0 |
| | ((cal/oC)/liter $N_2$) | (0.271) | (0.226) | (0.336) | (0.300) | (0.225) | (0.710) | (0.938) |

Table 2

| Experiment No. | | 1 | 2 | 3 | 4 | 5 | 6 | 7 | 8 | 9 | 10 | 11 | 12 |
|---|---|---|---|---|---|---|---|---|---|---|---|---|---|
| Gas temperature in the vessel | (°C) | 1100 | 1050 | 1020 | 1040 | 1120 | 1000 | 1080 | 1050 | 1010 | 1000 | 1060 | 1050 |
| Temperature of gas in the bag | (°C) | 300 | 240 | 260 | 275 | 210 | 190 | 230 | 240 | 275 | 240 | 100 | 40 |
| Temperature lowering | (°C) | 800 | 810 | 760 | 765 | 910 | 810 | 850 | 810 | 735 | 760 | 960 | 1010 |

### Table 3

| Gas component | Amount of gas |
| --- | --- |
| molecular nitrogen gas | 98.2 vol % |
| MOLECULAR OXYGEN GAS | 1.5 vol % |
| other gases (CO, CH₄ etc.) | a minute amount |

### Table 4

| mesh | the layer No. of gauzes | collecting rate (%) | time required until the inner pressure of the bag amounts to 1.2 kg/cm² abs (milliseconds) |
| --- | --- | --- | --- |
| 100 | 10 | 97.2 | 54.7 |
| 100 | 7 | 96.0 | 53.2 |
| 100 | 5 | 95.0 | 51.5 |
| 200 | 10 | 98.1 | 57.0 |
| 80 | 15 | 97.2 | 56.0 |
| 60 | 15 | 96.8 | 54.0 |
| 40 | 15 | 96.4 | 54.5 |
| 20 | 15 | 94.0 | 53.5 |

### Table 5

| unit of gauzes | repeating units | collecting rate (%) | time required until the inner pressure of the bag amounts to 1.2kg/cm² abs. (milliseconds) |
| --- | --- | --- | --- |
| 20–100 mesh | 5 | 98.2 | 48.0 |
| 20–200 mesh | 5 | 99.0 | 50.1 |
| 40–100 mesh | 5 | 99.2 | 49.1 |
| 40–200 mesh | 5 | 99.3 | 51.2 |
| 20–20–100 mesh | 5 | 99.5 | 48.2 |

### Table 6

| a layer (mesh, unit) | collecting rate % | time required until the inner presssure of the bag amounts to 1.2kg/cm² abs. (milliseconds) |
| --- | --- | --- |
| (20–100 mesh, 5)–(60–100 mesh, 2) | 99.1 | 49.2 |
| (20–20–100 mesh, 5)–100 mesh, 4) | 99.3 | 52.2 |
| (20–20–100 mesh, 5)–(60–100 mesh, 2) | 99.8 | 51.3 |

### Table 7

| mesh of unit | repeating units | collecting rate (%) | time required until the inner pressure of the bag amount to 1.2kg/cm² abs. (milliseconds) |
| --- | --- | --- | --- |
| 20–100 mesh | 5 | 98.3 | 47.5 |
| 20–200 mesh | 5 | 99.0 | 50.0 |
| 40–100 mesh | 5 | 99.1 | 49.0 |
| 40–200 mesh | 5 | 99.2 | 51.3 |
| 20–20–100 mesh | 5 | 99.5 | 48.5 |

### Table 8

| | mesh of wire gauze | diameter of wire | repeating units | weight (g) |
| --- | --- | --- | --- | --- |
| inside of the layer | 20 # | (0.420ᵐᵐ) | 1 unit | |
| " | 40 # | (0.193) | | |
| " | 100 # | (0.102) | | 195.7 |
| " | 60 # | (0.173) | | |
| " | 100 # | (0.102) | 1 unit | 4 |
| " | 200 # | (0.046) | 3 | |
| " | 300 # | (0.035) | 3 | 35.7 |
| outside of the layer | 10 # | ( — ) | 1 | |

### Table 9

| | wire gauges | | repeating units | weight (g) |
| --- | --- | --- | --- | --- |
| inside plain weave | 20 # | 0.42 | | |
| | 60 # | 0.173 | 1 unit 4 | 195.7 |
| | 100 # | 0.102 | | |
| outside twilled mushiro like weave | warp 0.165 mmφ × 5, | 36 # | | |
| | woof 0.13 × 7 | 30 # | 4 | 146.4 |
| | Total | | 16 gauzes | 342.1 (g) |

Table 10

| plain weave mesh | | diameter of wire | repeating units | | weight | |
|---|---|---|---|---|---|---|
| inside | 20 # | 0.420 | } 1 unit | 4 | 362 | (g) |
| | 60 # | 0.173 | | | | |
| | 160 # | 0.102 | | | | |
| | 40 # | 0.193 | } 1 unit | 4 | | |
| | 100 # | 0.102 | | | 245 | |
| | 200 # | 0.043 | | 3 | | |
| | 300 # | 0.035 | | 3 | | |
| | | Total | | 26 gauzes | 607 | (g) |

Table 11

| plain weave | diameter of gauze | | repeating units | weight | |
|---|---|---|---|---|---|
| 20 # | 0.420 | } 1 unit | 4 | 362 | (g) |
| 60 # | 0.173 | | | | |
| 100 # | 0.102 | | | | |
| twilled mushire | warp | 36 # | | | |
| like weave | 0.165mm$\phi \times$5 | | | | |
| | woof 0.13 ×7 | 30 # | 4 | 436 | |
| Total | | | 16 gauzes | 798 | (g) |

What is claimed is:

1. A gas generating system for the inflation of a protective bag to cushion a passenger from impact with the structure of a high speed vehicle comprising (1) a chamber surrounded by a layer of metal wire gauzes wherein said layer has a heat capacity above 5 calories/°C per 1 mol of the generated nitrogen gas, having a ratio of total surface area of the wires to the total volume of the wires in the range of 150–400 cm$^{-1}$, having a fractional void in the range of 60–90%, and having a thickness of 0.3–3 cm, (2) a gas generating chemical composition enclosed in the chamber, wherein said chemical composition is composed of (a) at least one metal azide selected from the group of alkali metal azides, alkali earth metal azides and hydroxy metal azides having the general formula M(OH)m(N$_3$)n, wherein M represents Mg, Ca, Mn, Co and Ni, N represents nitrogen atoms, and $m,n$ represent a positive number respectively where $m$ plus $n$ means atomic valency of M, and (b) at least one oxidizing agent, (3) at least one ignition tube for igniting said chemical composition in the chamber.

2. A gas generating system according to claim 1, wherein said gas generating chemical composition further contains a reductive metal powder as a third component.

3. A gas generating system according to claim 1, wherein a part of the chamber wall which does not form the passageway of the generated gas is substantially covered with a thick sheet of silicon resin to prevent the passenger and the bag completely from burning.

* * * * *